US009893798B2

(12) United States Patent
Shi

(10) Patent No.: US 9,893,798 B2
(45) Date of Patent: Feb. 13, 2018

(54) WIRELESSLY CONNECTING AN AIRCRAFT AT AN AIRPORT

(71) Applicant: The Boeing Company, Chicago, IL (US)

(72) Inventor: Fong Shi, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 429 days.

(21) Appl. No.: 14/169,462

(22) Filed: Jan. 31, 2014

(65) Prior Publication Data

US 2015/0222350 A1 Aug. 6, 2015

(51) Int. Cl.

| | |
|---|---|
| ***H04B 7/00*** | (2006.01) |
| ***H04B 7/185*** | (2006.01) |
| ***H04B 7/0491*** | (2017.01) |
| ***H04B 7/06*** | (2006.01) |
| ***H04B 7/08*** | (2006.01) |

(52) U.S. Cl.

CPC ....... *H04B 7/18506* (2013.01); *H04B 7/0491* (2013.01); *H04B 7/0695* (2013.01); *H04B 7/088* (2013.01)

(58) Field of Classification Search

CPC ........................... H04W 4/046; H04B 7/18506
USPC .......................................................... 342/367
See application file for complete search history.

(56) References Cited

U.S. PATENT DOCUMENTS 6,282,487 B1 * 8/2001 Shiomi ................ G06Q 10/047 340/935
8,391,135 B1 * 3/2013 Kuhn .................. H04B 17/327 370/227
8,688,101 B1 * 4/2014 Hayes .................... H04W 4/02 370/230
2003/0184485 A1 * 10/2003 Jiang .................... H01Q 13/106 343/767
2004/0132495 A1 * 7/2004 Horton, Jr. ........... G08G 5/0013 455/562.1
2005/0014533 A1 * 1/2005 Cave ................. H04W 74/0891 455/562.1
2008/0240029 A1 * 10/2008 Lynch ................ H04B 7/18508 370/329
2010/0054196 A1 * 3/2010 Hui ....................... H04W 16/00 370/329
2012/0050105 A1 * 3/2012 Wu ...................... H04B 7/0602 342/367

(Continued)

OTHER PUBLICATIONS

International Application No. PCT/US2014/062940; The Int'l Search Report and The Written Opinion; dated Apr. 7, 2015; 9 pages.

(Continued)

*Primary Examiner* — Marcus E Windrich
(74) *Attorney, Agent, or Firm* — Gates & Cooper LLP

(57) ABSTRACT

Disclosed are ways for wirelessly connecting an aircraft at an airport. For example, a method for wirelessly communicating with an aircraft may include determining a proximity of an aircraft of a directional antenna system for wireless communication, determining availability of the directional antenna system for wireless communication with the aircraft, selecting the directional antenna system based on the determined proximity and availability, and providing instructions for the directional antenna system to communicate with the aircraft.

20 Claims, 6 Drawing Sheets

(56) References Cited

U.S. PATENT DOCUMENTS

2013/0343364 A1* 12/2013 Fuller .................... H04W 4/02
370/338

OTHER PUBLICATIONS

International Patent Application No. PCT/US2014/062940; Int'l Preliminary Report on Patentability; dated Aug. 2, 2016; 6 pages.

* cited by examiner

WIRELESSLY CONNECTING AN AIRCRAFT AT AN AIRPORT

BACKGROUND

Commercial and non-commercial aircraft may download or upload various types of data. For example, various electronic instruments and devices on aircrafts contain stored information that may be updated, such as navigational charts and navigation data files. In addition, there may be other types of data downloaded or uploaded, such as movies, television shows, music, and diagnostic data, among other things.

Conventionally, for a wireless connection with airplane on airport ground, airport authorities generally required airport terminal and tarmac areas under wireless coverage to be within confined areas to reduce unwanted RF energy. In fact, wireless data throughput per current industry standards has already reduced significantly due to severe radio frequency (RF) interference at busy civil airports.

SUMMARY

The features, functions, and advantages that have been discussed can be achieved independently in various implementations or may be combined in yet other implementations, further details of which can be seen with reference to the following description and drawings.

Disclosed herein are methods and systems for wirelessly connecting an aircraft at an airport. In an example, a system for wirelessly communicating with an aircraft may include a directional antenna system, a processor communicatively connected with the antenna, and a memory communicatively connected with the processor. The memory may include executable instructions that when executed by the processor cause the processor to effectuate operations comprising determining a proximity of the aircraft of the directional antenna system for wireless communication, determining availability of the directional antenna system for wireless communication with the aircraft, selecting the directional antenna system based on the determined proximity and availability, and providing instructions for the directional antenna system to communicate with the aircraft.

In another example, a method for wirelessly communicating with an aircraft may include determining a proximity of the aircraft of a directional antenna system for wireless communication, determining availability of the directional antenna system for wireless communication with the aircraft, selecting the directional antenna system based on the determined proximity and availability, and providing instructions for the directional antenna system to communicate with the aircraft.

In another example, a computer readable storage medium may include instructions for wirelessly communicating with an aircraft that include determining a proximity of the aircraft of a directional antenna system for wireless communication, determining availability of the directional antenna system for wireless communication with the aircraft, selecting the directional antenna system based on the determined proximity and availability, and providing instructions for the directional antenna system to communicate with the aircraft.

DETAILED DESCRIPTION

When an aircraft lands, a large amount of data may be uploaded or downloaded via wireless or wireline. The data may be related to any number of things, such as flight data, maintenance data, navigation data, point-of-sale transactions, and the like. Conventionally, an omni-directional antenna produced unwanted energy and interfered with others and a phased array antenna was cost prohibitive for uses at commercial airports. Disclosed herein are methods and systems for wirelessly connecting aircrafts. Example systems include the use of low cost slot antennas with high gain and selective features among fixed beams that wirelessly connect aircrafts at airports. Connections may be made when an airplane is stationary or taxiing in an airport environment.

Figure 1:
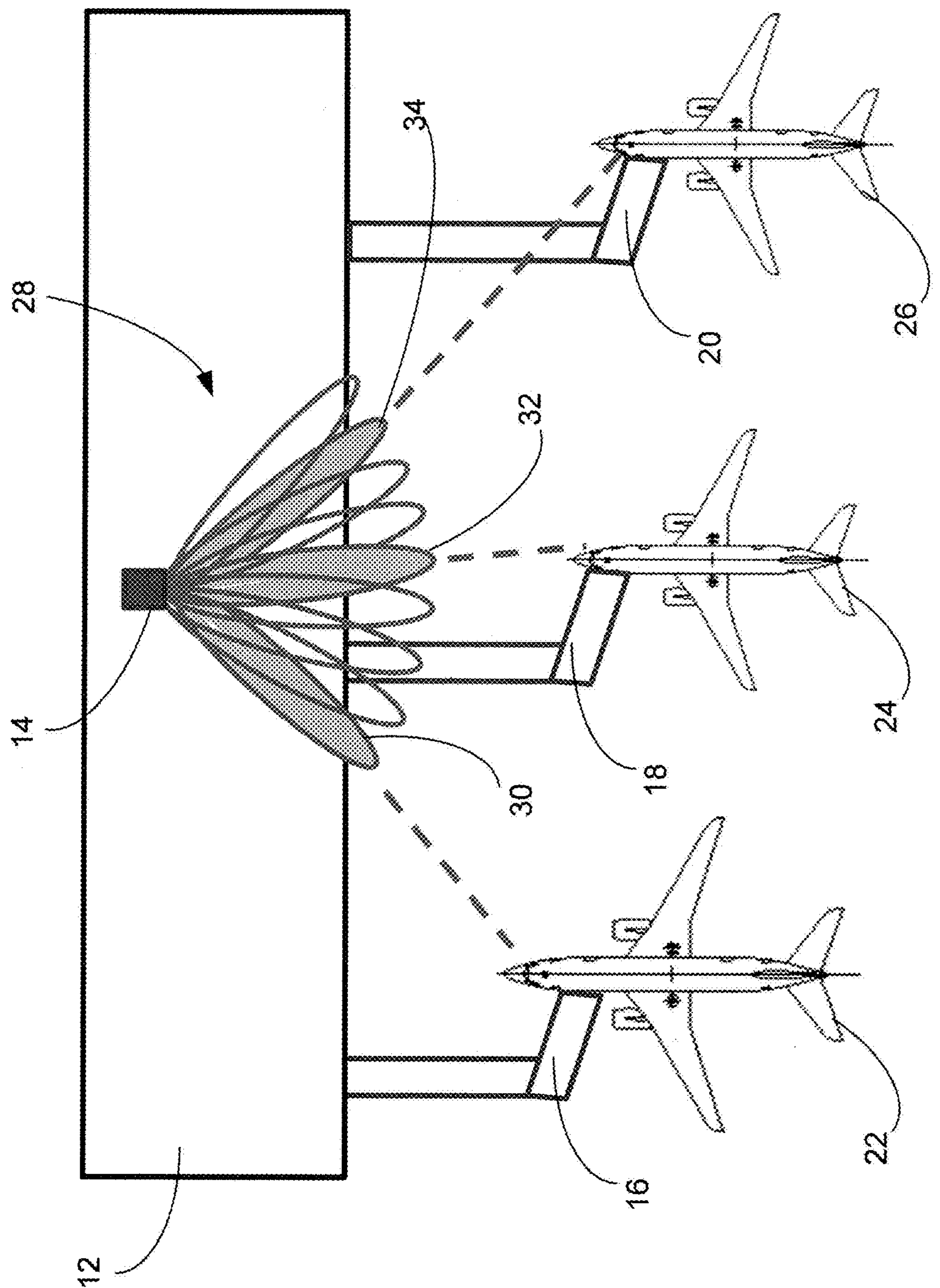
FIG. 1 illustrates a directional antenna connecting with multiple airplanes at an airport terminal.

FIG. 1 illustrates directional antenna 14 connecting with multiple stationary airplanes at airport terminal 12. Airplane 22 is located at gate 16, airplane 24 is located at gate 18, and airplane 26 is located at gate 20. Directional antenna 14 may be located on top of airport terminal 12. A plurality of beams 28 (i.e., electromagnetic waves or lobes) may emanate from antenna 14. Beam 30 may be directed towards an omni-directional or directional antenna (not shown) of airplane 22. Beam 32 may be directed towards an omni-directional or directional antenna (not shown) of airplane 24. In addition, beam 34 may be directed towards an omni-directional or directional antenna (not shown) of airplane 26. Directional antenna 14 and the antennas of airplane 22, airplane 24, and airplane 26 may be wirelessly connected. The wireless communication between devices may be based on a worldwide wireless standard, such as 802.11a, 802.11 b, 802.11 g, 802.11n, 802.11ac, or future global standards.

In an example, a plurality of beams 28 may be configured using the 802.11b wireless standard. In FIG. 1, eleven channels may be used for data communications with external devices, while the other channels (e.g., channel 12-14 may be used in other countries, but not in the United States) may be disabled. In FIG. 1, beam 30 may coincide with 802.11b channel one, beam 32 may coincide with 802.11b channel six, and beam 34 may coincide with 802.11b channel eleven. The separation between channels helps minimize interference and maximize bandwidth for uploading or downloading data.

Figure 2:
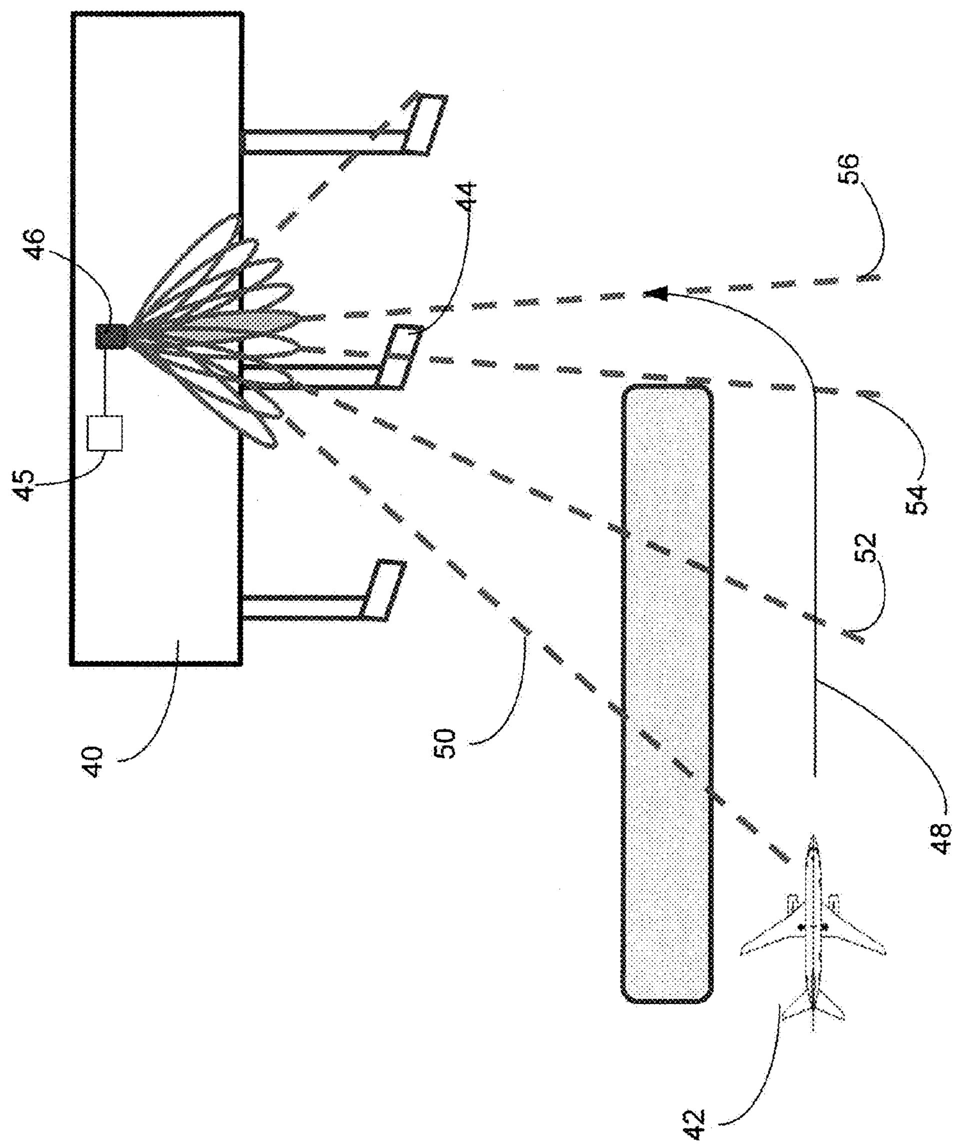
FIG. 2 illustrates a directional antenna connecting with an airplane before it reaches an airport terminal building at an airport.

FIG. 2 illustrates directional antenna 46 connecting with moving airplane 42 before it reaches airport terminal 40 at an airport. In an example, airplane 42 initially may communicatively connect with directional antenna 46 via beam 50 as airplane 42 travels along path 48 to gate 44. As airplane 46 proceeds along path 48 to gate 44, directional antenna 46 may switch between beam 50, beam 52, beam 54, and beam 56 in order to continually communicate with airplane 42. Antenna 46 may be communicatively connected with a computing device 45. Computing device 45 may track airplane 42 (e.g., via GPS, a wireless sensor, or a video camera) and provide instructions to directional antenna 46 to switch from one beam to another beam to facilitate communication with airplane 42. Directional antenna 46 may be any directional antenna type, such as the ones discussed herein. For example, directional antenna 46 may be a parabolic antenna and may be physically turned along an axis in order to communicate with airplane 42.

Figure 3:
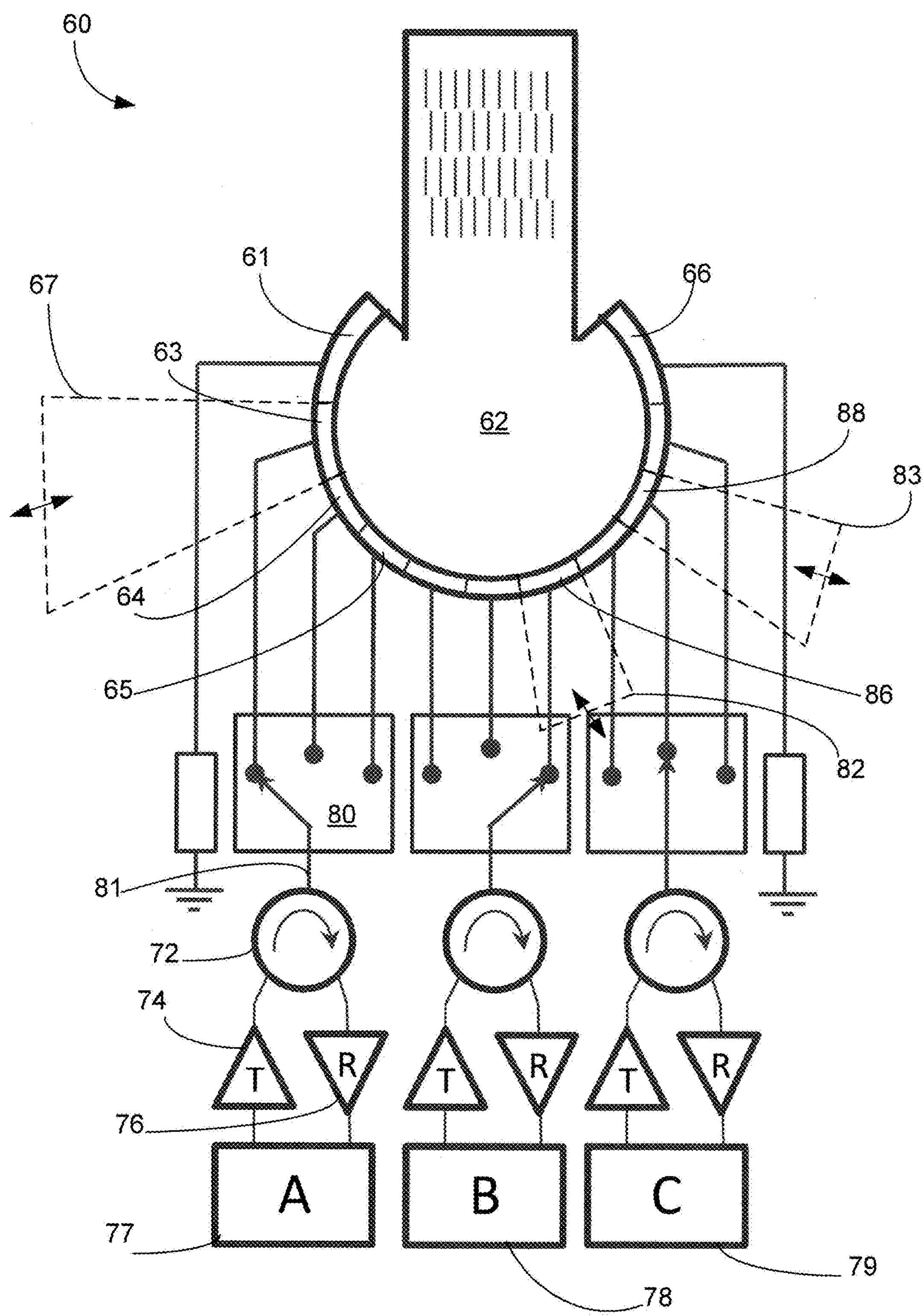
FIG. 3 illustrates a block diagram of directional antenna system that may be used to implement the disclosed systems and methods.

FIG. 3 illustrates a block diagram of directional antenna system 60 that may be used to implement the disclosed systems and methods that may connect to multiple airplanes (e.g., three). Directional antenna system 60 may be a sectorized beam antenna where electromagnetic waves pass through the openings of an array of slots located at the front end of antenna 62. Block A 77, block B 78, and block C 79 are a selection of channels that may be used with the directional antenna. For example, if the aforementioned 802.11 standard was used, block A 77 may be channel one, block B 78 may be channel six, and block C 79 may be channel eleven. Channel one, channel six, and channel eleven may be used to minimize wireless interference when using the 802.11 standard to communicate.

Transmit amplifier 74 and receive amplifier 76 are signal amplifiers that are communicatively connected with circulator 72. Circulator 72 may assist in separating the transmit signals of transmit amplifier 74 from the received signals for receive amplifier 76. Circulator 72 is communicatively connected with single pole triple throw switch (SP3T) 80, which controls the direction of the beam (electromagnetic wave). As shown in FIG. 3, connection 81 is connected with port 63 of antenna 62. Signals carried by electromagnetic waves along path 67 through port 63 will be coupled to the slot array and emanate in the direction (main lobe) from the slot array. SP3T 80 also may be switched and connect to port 64 or port 65. The direction of the coupled electromagnetic waves through the slot array corresponding to the channel of block A 77 may be transmitted or received in port 64 or port 65 when selected by SP3T 80. Port 61 and port 66, as shown in FIG. 3, can be properly terminated to suppress side lobes. Port 86, coupled to the slot array, is selected to correspond to the channel of block B 78. Port 88, coupled to the slot array, is selected to correspond to the channel of block C 79. Signals carried by electromagnetic waves along path 82 and path 83 are transmitted or received through respective port 86 and port 88. Port 86 and port 88 are coupled to the entire slot array and emanate in their own directions (main lobe of each) from the same slot array. Directional antenna system 60 may have additional switches which correspond with slots of antenna 62. There may be any number of subdivided switches or corresponding slots.

Figure 4:
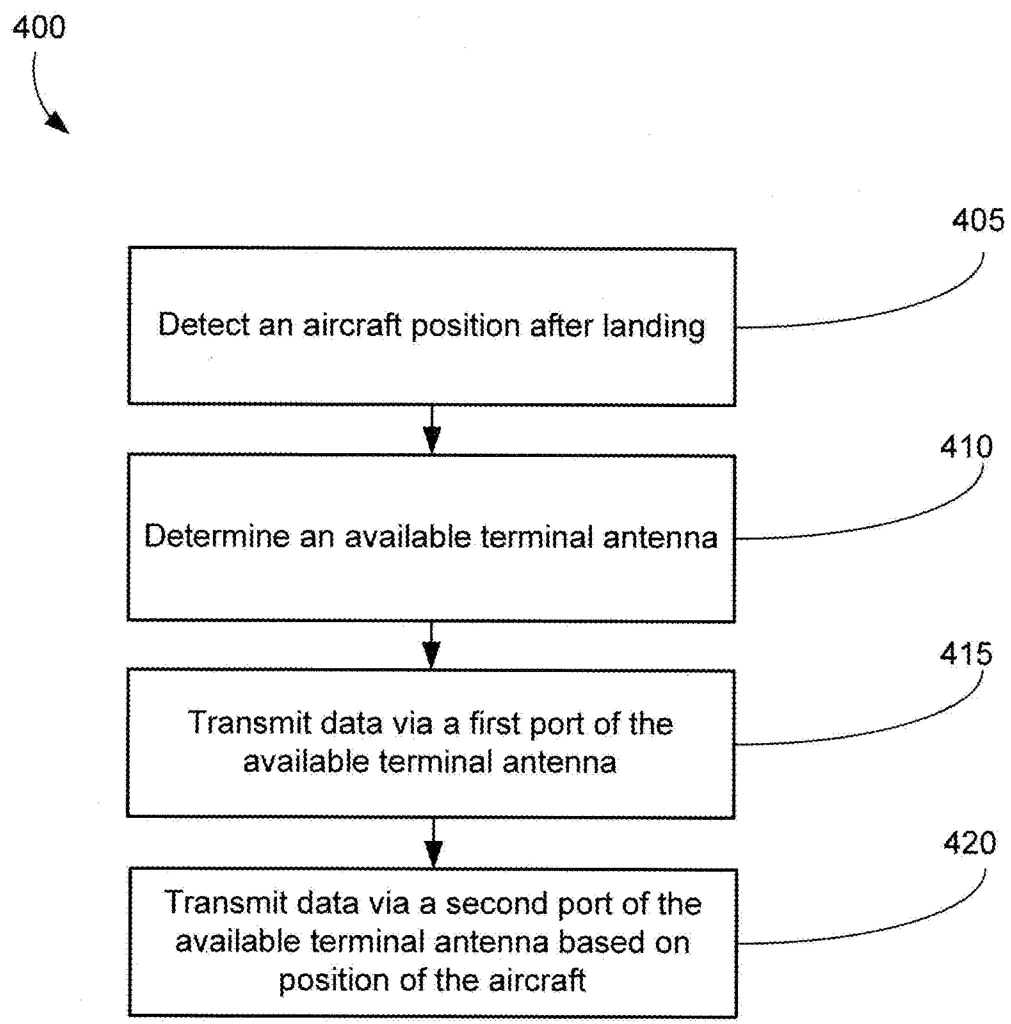
FIG. 4 illustrates an example method for wirelessly connecting an aircraft using a directional antenna.

FIG. 4 illustrates an example method that uses directional antennas to communicate with arriving aircraft at an airport. At block 405, the position of an aircraft, which may be along a taxiway or airport tarmac, is detected after the aircraft lands. The aircraft may initiate communication based on the aircraft wheels touching the ground or by some other method. At block 410, an appropriate terminal antenna may be selected for the aircraft to communicate with. The terminal antenna may be selected based on the proximity of the aircraft to the antenna, the availability of the antenna (e.g., ports not in use), the expected bandwidth needed based on the amount of data to be uploaded or downloaded to the aircraft, the location where the airplane will be parked, the expected departure time of the aircraft (e.g., may not want to wait to get to the gate for short layovers), or the like. At block 415, the data may be transmitted via an initially selected (first) port of the antenna on a terminal building or other structure. At block 420, the data may be transmitted via another port of the initially selected antenna (or entirely different antenna), based on the position or speed of the aircraft. In an example, the position and the detected speed or projected speed (e.g., a projection of a slow speed at an intersection during taxiing) of the aircraft may be taken into account before determining which antenna to select. Available ports of the antenna may be cycled through to transmit data until the airplane makes a full stop. The method as described herein is also exchangeable for departing airplanes leaving parked positions and moving along the tarmac before takeoff.

Figure 5:
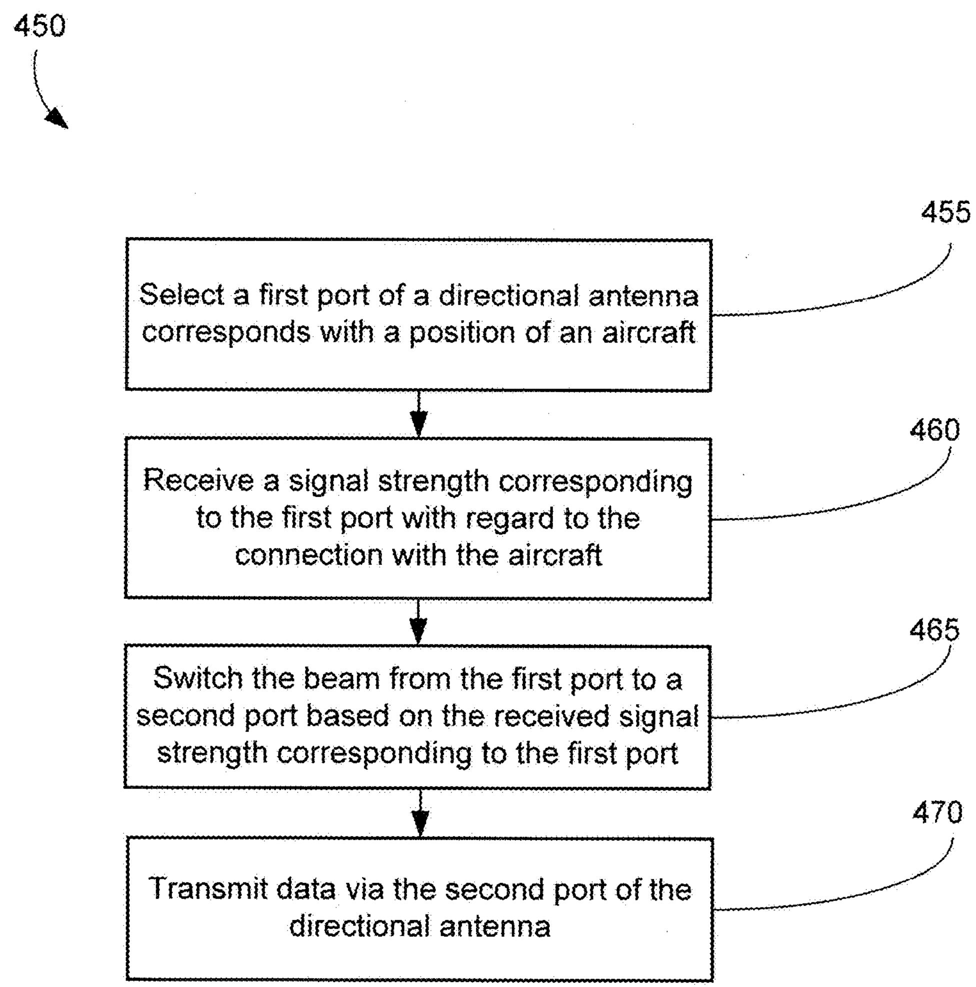
FIG. 5 illustrates an example method for wirelessly connecting an aircraft using a directional antenna.

For aircraft in a taxiing motion (e.g., FIG. 2), beams may be selected and switched among available fixed beams of an antenna according to a known or predetermined taxiing path along airport tarmac. FIG. 5 illustrates an example method 450 that uses a directional antenna to communicate with aircraft at an airport. At block 455, a first port of a directional antenna that corresponds with a position of an aircraft is selected. At block 460, signal strength is received. The signal strength is the signal strength between the aircraft and the first port. A receiver signal strength indication (RSSI) may be used for tracking the aircraft. At block 465, based on the signal strength between the first port and the aircraft, a second port is selected to service the aircraft. At block 470, data is transmitted to the aircraft via the second port of the directional antenna. The method illustrated in FIG. 5 may be particularly applicable for aircraft moving along an undetermined path. In an example, adjacent beams from a second and a third port on both left and right sides of the first port may be selected when the signal strength of the first port reaches a threshold level. The second port and third port RSSI signals may be compared and a decision may be made to choose the port with higher signal strength towards the airplane. This process may continue until even after the airplane makes a stop, in order to account for atmospheric conditions or expected/unexpected movement of the directional antenna. The method is applicable for aircraft moving along a tarmac before takeoff.

Methods and systems for wirelessly connecting an aircraft may use any number of types of directional antennas. The directional antenna may be a sector antenna, a Yagi antenna, a patch antenna, a quad antenna, a billboard antenna, a parabolic antenna, a helical antenna, an array of multiple antennas, or a digital beamforming antenna.

Generally, aircrafts may transmit or receive large amounts of data in an environment that has the potential for significant interference or restriction for wireless communication. Without unduly limiting the scope, interpretation, or application of the claims appearing herein, the disclosed subject matter may be used with inexpensive antennas that also maximize bandwidth for downloading and uploading data to or from an aircraft. Connecting airplanes and other aircraft on the ground of an airport may not need continuous beam steering or precision steering at very fine steps. Therefore, instead of a motorized dish or a phased array, for example, a directional slot antenna that is surface integrated to have multiple fixed beams to choose from may be used. Directional slot antennas, such as the one described in FIG. 3, may be deployed at low cost. Directional slot antennas may be fabricated using commercial multi-layer laminated printed circuit boards where arrays of ports and slots, transmission lines and waveguides, shifters, splitters and couplers may be integrated within multiple layers of the printed circuit board. Multiple fixed beams may be formed simultaneously without turning the antenna assembly. By selecting one or more of the fixed beams of the antenna, a single switchable communication link or multiple non-overlapping links may be established. Materials of the printed circuit board may have low signal attenuation (i.e., low loss) at the carrier frequencies. In this case, its frequency of operation may be in the commonly used IEEE 802.11 bands, which has abundant global suppliers.

Figure 6:
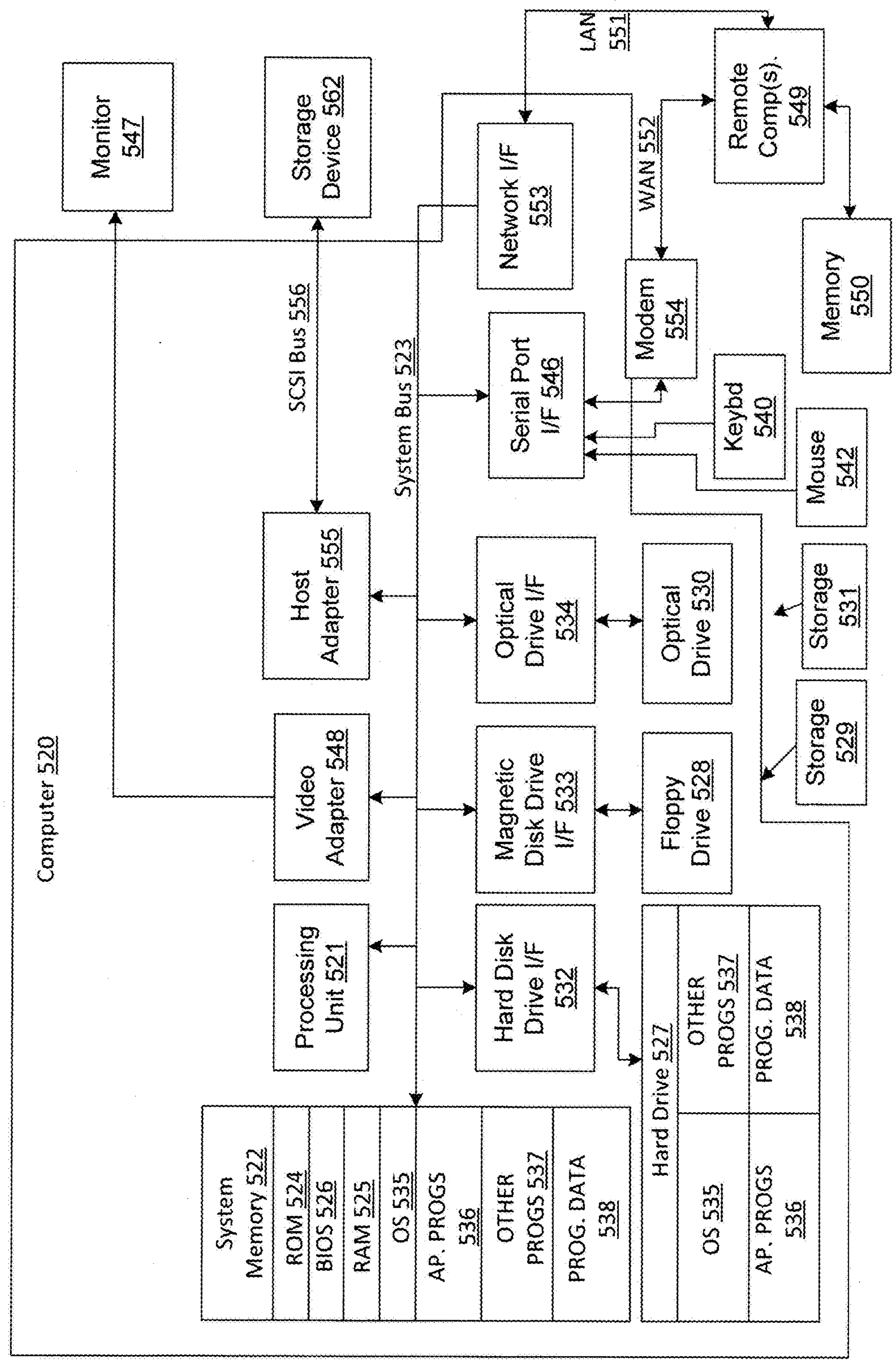
FIG. 6 illustrates a block diagram representing a general purpose computer system in which aspects of the methods and systems disclosed herein or portions thereof may be incorporated.

FIG. 6 and the following discussion are intended to provide a brief general description of a suitable computing environment in which the methods and systems disclosed herein and/or portions thereof may be implemented. Although not required, the methods and systems disclosed herein is described in the general context of computer-executable instructions, such as program modules, being executed by a computer, such as a client workstation, server, personal computer, or mobile computing device such as a smartphone or tablet computer. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 6 is a block diagram representing a general purpose computer system in which aspects of the methods and systems disclosed herein and/or portions thereof may be incorporated. As shown, the exemplary general purpose computing system includes a computer 520 or the like, including a processing unit 521, a system memory 522, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read-only memory (ROM) 524 and random access memory (RAM) 525. A basic input/output system 526 (BIOS), containing the basic routines that help to transfer information between elements within the computer 520, such as during start-up, is stored in ROM 524.

The computer 520 may further include a hard disk drive 527 for reading from and writing to a hard disk (not shown), a magnetic disk drive 528 for reading from or writing to a removable magnetic disk 529, and an optical disk drive 530 for reading from or writing to a removable optical disk 531 such as a CD-ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. Although not shown in FIG. 6, any applicable communication antenna drive interface may attach to system bus 523 to handle commands for beam control and data exchange to-and-from airplanes. The drives and their associated computer-readable media provide nonvolatile storage of computer readable instructions, data structures, program modules and other data for the computer 520. As described herein, computer-readable media is a tangible, physical, and concrete article of manufacture and thus not a signal per se.

Although the exemplary environment described herein employs a hard disk, a removable magnetic disk 529, and a removable optical disk 531, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 529, optical disk 531, ROM 524 or RAM 525, including an operating system 535, one or more application programs 536 which may include but are not limited to the aforementioned antenna beam control algorithm, other program modules 537 and program data 538. A user may enter commands and information into the computer 520 through input devices such as a keyboard 540 and pointing device 542. Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, a computer may include other peripheral output devices (not shown), such as speakers and printers. The exemplary system of FIG. 6 also includes a host adapter 555, a Small Computer System Interface (SCSI) bus 556, and an external storage device 562 connected to the SCSI bus 556.

For connecting airlines operation centers and their fleet at airports, computer 520 incorporating proper firewalls and among other data protection measures may operate in a secured networked environment using logical connections to one or more remote computers, such as a remote computer 549. The remote computer 549 may be a personal computer, a server, a router, a network PC, a cloud based computer with a mass storage, a peer device or other common network node, and may include many or all of the elements described above relative to the computer 520, although only a memory storage device 550 has been illustrated in FIG. 6. The logical connections depicted in FIG. 6 include a local area network (LAN) 551 and a wide area network (WAN) 552, including all versions of wired network and wireless network. Such networking environments are commonplace in offices, enterprise-wide computer networks, intranets, and the Internet.

When used in a LAN networking environment, the computer 520 is connected to the LAN 551 through a network interface or adapter 553. When used in a WAN networking environment, the computer 520 may include a modem 554 or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing a communications link between the computers may be used.

Computer 520 may include a variety of computer readable storage media. Computer readable storage media can be any available media that can be accessed by computer 520 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 520. Combinations of any of the above should also be included within the scope of computer readable media that may be used to store source code for implementing the methods and systems described herein. Any combination of the features or elements disclosed herein may be used in one or more embodiments.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for wirelessly communicating with an aircraft, the system comprising:

a directional slot antenna;

a processor communicatively connected with the directional slot antenna; and a memory communicatively connected with the processor, the memory comprising executable instructions that when executed by the processor cause the processor to effectuate operations comprising:

determining a proximity of the aircraft to the directional slot antenna for wireless communication based on receiver signal strength indication (RSSI) data at the directional slot antenna and the aircraft;

determining availability of a plurality of slots of the directional slot antenna-for wireless communication with the aircraft;

determining an expected departure time of the aircraft;

selecting a slot of the plurality of slots of the directional slot antenna based on the determined proximity, the expected departure time, the availability of the plurality of slots, and a determination that the RSSI data has reached a threshold level; and providing instructions for the directional slot antenna to communicate with the aircraft via the selected slot.

2. The system of claim 1, wherein the directional slot antenna is a sector antenna.

3. The system of claim 1, wherein selecting the slot of the directional slot antenna further comprises:

determining an expected bandwidth needed based on an amount of data to be uploaded or downloaded to the aircraft.

4. The system of claim 1, wherein the directional slot antenna comprises a first slot and a second slot of the plurality of slots, wherein electromagnetic waves emanating from the first slot coincide with a different channel than electromagnetic waves emanating from the second slot.

5. The system of claim 1, wherein the directional slot antenna comprises a first slot and a second slot of the plurality of slots for communicating with the aircraft.

6. The system of claim 5, the memory further comprising executable instructions that when executed by the processor cause the processor to effectuate operations comprising:

determining whether to communicate via the first slot or the second slot of the plurality of slots based on at least one of speed or position of the aircraft.

7. The system of claim 1, wherein the aircraft uses an omni-directional antenna to communicate with the directional slot antenna.

8. The system of claim 1, wherein the directional slot antenna uses an 802.11 wireless standard.

9. A method for wirelessly communicating with an aircraft, the method comprising:

determining, by a processor, a proximity of the aircraft to a directional slot antenna for wireless communication based on receiver signal strength indication (RSSI) data at the directional slot antenna and the aircraft;

determining, by the processor, availability of a plurality of slots of the directional slot for wireless communication with the aircraft;

determining, by the processor, an expected departure time of the aircraft;

selecting, by the processor, a slot of the plurality of slots of the directional slot antenna based on the determined proximity, expected departure time, availability, and a determination that the RSSI data has reached a threshold level; and providing, by the processor, instructions for the directional slot antenna to communicate with the aircraft via the selected slot.

10. The method of claim 9, wherein the directional slot antenna is a quad antenna, a billboard antenna, parabolic antenna, or a helical antenna.

11. The method of claim 9, wherein selecting the slot of the plurality of slots of the directional slot antenna further comprises:

determining an expected bandwidth needed based on an amount of data to be uploaded or downloaded to the aircraft.

12. The method of claim 9, wherein the directional slot antenna comprises a first slot and a second slot of the plurality of slots, wherein electromagnetic waves emanating from the first slot coincide with a different channel than electromagnetic waves emanating from the second slot.

13. The method of claim 9, wherein the directional slot antenna comprises a first slot and a second slot of the plurality of slots for communicating with the aircraft.

14. The method of claim 13, the method further comprising:

determining whether to communicate via the first slot or the second slot of the plurality of slots based on at least one of speed or position of the aircraft.

15. The method of claim 9, wherein the aircraft uses an omni-directional antenna to communicate with the directional slot antenna.

16. The method of claim 9, wherein the directional slot antenna is partitioned to communicate with the aircraft in a first direction via a first partition and communicate with a second aircraft in a second direction via a second partition.

17. A computer readable storage medium that comprises instructions for communicating with an aircraft that when executed by a processor cause the processor to effectuate operations comprising:

determining a proximity of the aircraft to a directional slot antenna for wireless communication based on receiver signal strength indication (RSSI) data at the directional slot antenna and the aircraft;

determining availability of a plurality of slots of the directional slot antenna for wireless communication with the aircraft;

determining an expected departure time of the aircraft;

selecting a slot of the plurality of slots of the directional slot antenna based on the determined proximity, expected departure time, availability, and a determination that the RSSI data has reached a threshold level; and providing instructions for the directional slot antenna to communicate with the aircraft via the selected slot.

18. The computer readable storage medium of claim 17, further comprising executable instructions comprising:

partitioning the directional slot antenna to communicate with the aircraft in a first direction via a first partition and communicate with a second aircraft in a second direction via a second partition.

19. The computer readable storage medium of claim 17, further comprising executable instructions comprising:

determining whether to communicate via a first slot of the directional slot antenna or communicate via a second slot of the directional slot antenna based on at least one of speed or position of the aircraft.

20. The computer readable storage medium of claim 17, further comprising executable instructions comprising:

determining whether to communicate using a first wireless channel via a first slot of the directional slot antenna or communicate using a second wireless channel via a second slot of the directional slot antenna based on speed or direction of the aircraft.

* * * * *